(12) United States Patent
Horn

(10) Patent No.: US 8,272,527 B2
(45) Date of Patent: Sep. 25, 2012

(54) LATCHING ASSEMBLY FOR A PRESSURIZED TANK COVER

(75) Inventor: Rodney Samuel Horn, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 1289 days.

(21) Appl. No.: 11/775,346

(22) Filed: Jul. 10, 2007

(65) Prior Publication Data
US 2009/0014447 A1    Jan. 15, 2009

(51) Int. Cl.
*B65D 45/20* (2006.01)
*B65D 43/16* (2006.01)
*E05D 15/50* (2006.01)
*E05C 19/12* (2006.01)

(52) U.S. Cl. .......... 220/324; 220/833; 220/849; 16/230; 16/231; 292/113; 292/247; 292/336.3; 105/377.06

(58) Field of Classification Search .......... 220/324, 220/326, 833, 849, 908; 16/230, 231, 232; 292/113, 247, 336.3; 215/284, 280, 285, 215/286; 24/68 CD; 105/377.05, 377.06
See application file for complete search history.

(56) References Cited

U.S. PATENT DOCUMENTS

| | | | |
|---|---|---|---|
| 1,988,585 A | 1/1935 | Dath | |
| 2,349,486 A * | 5/1944 | Crosman | 16/232 |
| 3,368,711 A | 2/1968 | Dubo | |
| 3,493,131 A * | 2/1970 | Allen | 105/377.05 |
| 3,596,403 A | 8/1971 | Carr | |
| 4,372,603 A | 2/1983 | Stanczak et al. | |
| 4,441,431 A | 4/1984 | Carney, Jr. et al. | |
| 4,607,760 A | 8/1986 | Roche | |
| 4,655,365 A | 4/1987 | Miller | |
| 4,854,010 A | 8/1989 | Maraghe et al. | |
| 4,915,913 A * | 4/1990 | Williams et al. | 422/119 |
| 5,887,744 A | 3/1999 | Mejias | |
| 6,840,572 B2 | 1/2005 | Sillanpaa | |

FOREIGN PATENT DOCUMENTS

DE      3516720 A1    11/1986

* cited by examiner

*Primary Examiner* — Anthony Stashick
*Assistant Examiner* — James N Smalley
(74) *Attorney, Agent, or Firm* — Rebecca Henkel

(57) ABSTRACT

An assembly for covering an opening formed in a pressurized tank of an agricultural vehicle includes a cover having a first compression surface and a second compression surface. A hinge assembly is included that has a hinge arm rotatably coupled to the tank intermediate its ends. The hinge assembly further includes a hinge link rotatably coupled to the hinge arm at one end and rotatably coupled to the first compression surface at the other. A latch assembly is provided that has a latch arm rotatably coupled to the tank intermediate its ends. The latch assembly further includes a latch link rotatably coupled to the latch arm at one end and releasably engaging the second compression surface at the other. Accordingly, rotating the hinge and latch arms results in a first and second pressure engaging the cover along the first and second compression surfaces to secure the cover to the tank.

7 Claims, 12 Drawing Sheets

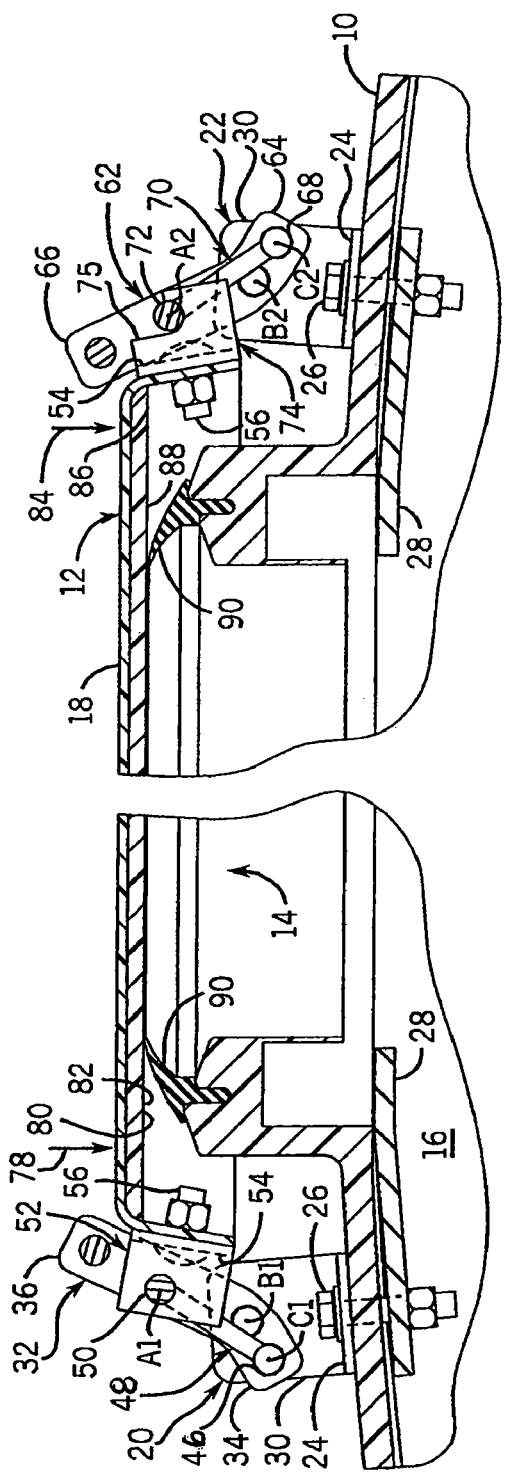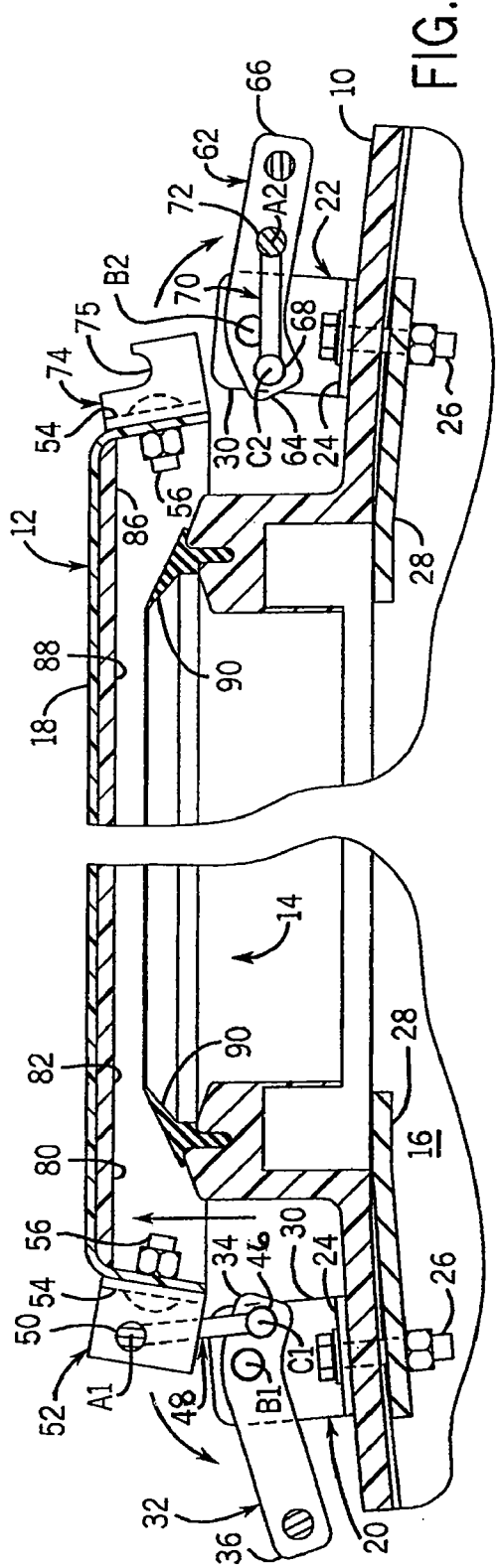

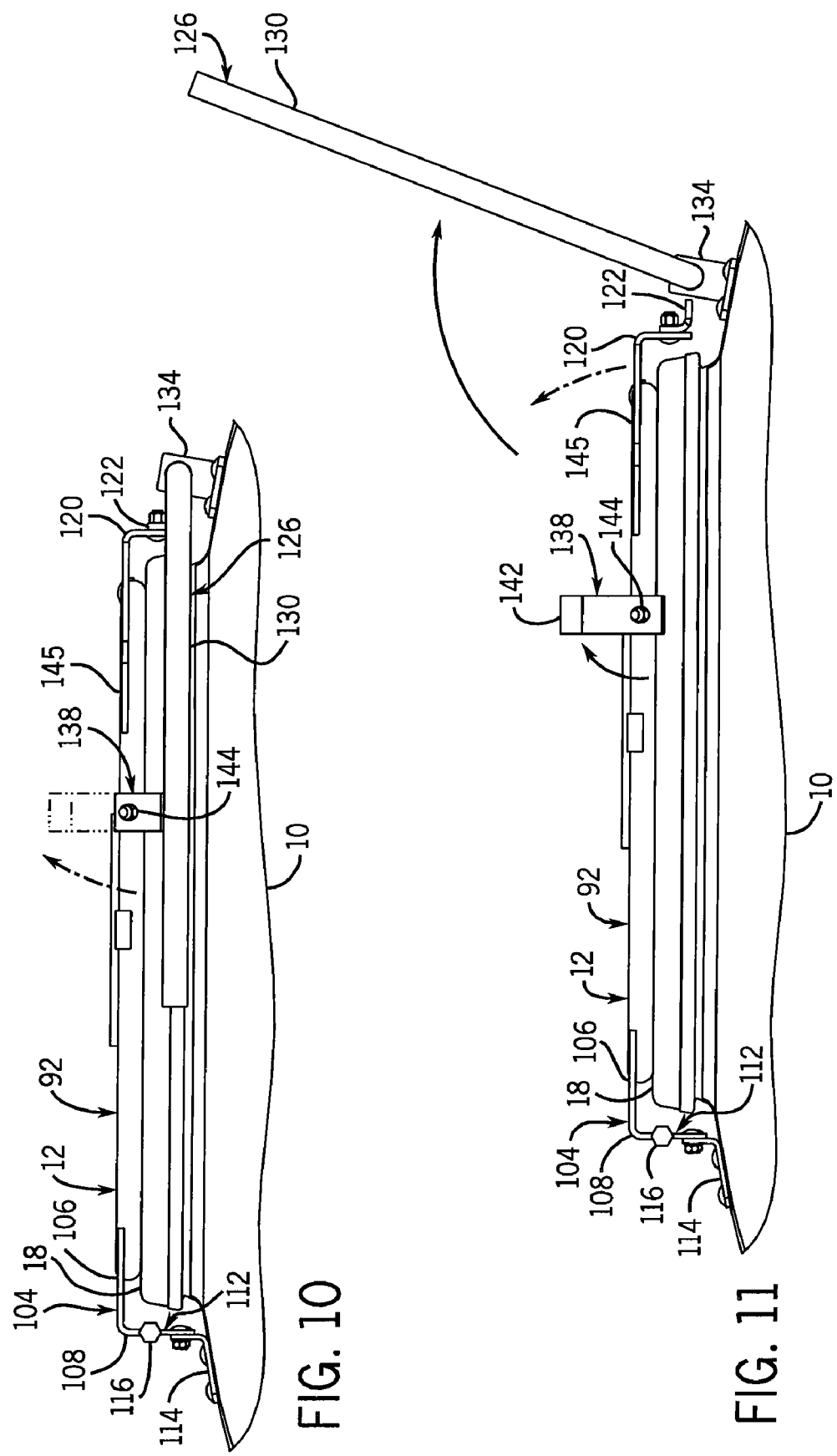

LATCHING ASSEMBLY FOR A PRESSURIZED TANK COVER

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to agricultural vehicles, and more particularly, to a system and method for latching a pressurized tank cover.

BACKGROUND OF THE INVENTION

Agricultural vehicles, such as tractors and combines, are ubiquitous in the agricultural industry. As an agricultural vehicle travels across a field, agricultural processes such as plating and/or fertilizing are performed by an implement associated with the vehicle. One particular class of implements, such as planters and air carts, incorporate a low pressure tank housing a substance (e.g., seed, fertilizer, and the like) prior to its application. The tank is typically connected to a pressurized delivery system to meter and deliver the contents of the tank to the field.

The tanks used are relatively large and bulky having a typical volume between 30 bushels [960 quarts] and 60 bushels [1920 quarts] for a typical planter to over 100 bushels [3200 quarts] for air carts. Depending upon the application, the tanks may be pneumatically pressurized to between 10 ounces per square inch [4.3 kilopascals] and 16 ounces per square inch [6.9 kilopascals] to facilitate delivery of the contents. Tanks are typically made from plastic, such as polyethylene, to enhance durability, ensure chemical compatibility with the tank contents, and accommodate the delivery pressure; however, tanks may be made from any other suitable material, such as steel.

Several issues arise in relation with the typical pressurized tank, and specifically, in connection with the sealing interface between the cover and the opening formed in the tank. First, due to the relatively large size of the tanks and the desire to maintain economical production, manufacturing tolerances of typical molded tanks introduces variation in the dimensions of the opening formed in the tank. Second, the tanks are susceptible to deformation caused by the pressure differential between the internal pressure required for delivery of the substance and the external atmospheric pressure. Over time, these two problems can combine to deteriorate the quality of the seal formed between the tank and the related cover.

In connection with the operation of the tank latch assembly, the large size of the tanks and associated covers present additional impediments to efficient operation of the tank cover and latching assembly. First, the placement of the tanks typically requires some type of latter or platform to reach the cover and move it between an open and closed position. Second, the desire to create a seal about the entire perimeter of the tank opening often leads to latch assemblies that are difficult to operate due to awkward placement of the latches and locking mechanisms used to secure the cover to the tank. For example, the mechanisms may require one to reach multiple areas around the cover to both engage and disengage the cover. These problems combine to impede the ease of operation of traditional low pressure tank latch assemblies.

As a result, a need exists for a pressurized tank cover latching assembly that effectively seals the tank opening and is convenient to operate.

SUMMARY OF THE INVENTION

The present invention overcomes the aforementioned drawbacks by providing an improved latching assembly that creates a substantially uniform pressure to seal the cover over the opening and is convenient to operate.

In accordance with one aspect of the invention, an assembly for covering an opening formed in a pressurized tank of an agricultural vehicle is disclosed that includes a cover configured to close the opening. The cover has a first compression surface extending along a first plane and a second compression surface extending along a second plane. The assembly includes a hinge assembly having a hinge arm with a first end and a second end and is configured to be rotatably coupled to the tank intermediate the first and second ends. The hinge assembly further includes a hinge link with a first end rotatably coupled to the first end of the hinge arm and a second end configured to be rotatably coupled to the first compression surface of the cover. The assembly also includes a latch assembly having a latch arm with a first end and a second end and is configured to be rotatably coupled to the tank intermediate the first and second ends. The latch assembly further includes a latch link with a first end rotatably coupled to the first end of the latch arm and a second end configured to releasably engage the second compression surface of the cover. The assembly is configured such that rotating the hinge arm from a first hinge position to a second hinge position results in a first pressure engaging the cover along the first compression surface substantially perpendicular to the first plane. And, rotating the latch arm from a first latch position to a second latch position results in a second pressure engaging the cover along the second compression surface substantially perpendicular to the second plane so as to secure the cover over the opening formed in the pressurized tank.

The assembly may also include at least a pair of hinge assemblies spaced apart along the first compression surface of the cover.

Furthermore, the assembly may include at least a pair of latch assemblies spaced apart along the second compression surface of the cover.

The assembly may also include a hinge handle linking the second ends of the hinge arms.

Furthermore, the assembly may include a latch handle linking the second ends of the latch arms.

According to at least one embodiment, the hinge arm and hinge link may be configured to create an over center hinge such that in rotating the hinge arm from the first hinge position to the second hinge position toward the cover the hinge arm passes through an intermediate over center hinge position. Furthermore, the latch arm and latch link may be configured to create an over center latch such that in rotating the latch arm from the first latch position to the second latch position toward the cover the latch arm passes through an intermediate over center latch position.

The assembly may also include a seal formed about a perimeter of the cover to seal between the cover and the opening formed in the pressurized tank when the first pressure and second pressure engage the cover along the first compression surface and second compression surface, respectively.

Additionally, according to an additional embodiment, rotating the hinge arm from the first hinge position to the second hinge position and rotating the latch arm from the first latch position to the second latch position may result in a third pressure engaging the cover along a third compression surface substantially perpendicular to a third plane and a fourth pressure engaging the cover along a fourth compression surface substantially perpendicular to a fourth plane so as to secure the cover over the opening formed in the pressurized tank and to resist deformation of the pressurized tank.

According to another embodiment, the first, second, third, and fourth planes may be substantially coplanar.

In accordance with another aspect of the invention, an assembly for securing a cover over an opening formed in a pressurized tank of an agricultural vehicle is disclosed. The assembly includes a frame with a first end and a second end. The frame is configured to support the cover that is sized to engage the opening formed in the pressurized tank. The assembly further includes a hinge configured to rotatably couple the first end of the frame to the tank so that the frame is rotatable from a first position away from the opening to a second position over the opening. A flange extends from the second end of the frame. A latch with a tab is further included and configured to be rotatably coupled to the tank so that the latch is rotatable from a disengaged position at which the frame is rotatable to an engaged position at which rotation of the frame while in the second position is prevented by engagement between the flange and the tab. Furthermore, a latch handle is coupled to the latch for rotating the latch between the disengaged and engaged positions.

Additionally, according to at least one embodiment, the latch handle may be located adjacent a side of the pressurized tank to allow the latch to be rotated between the disengaged and engaged positions.

The assembly may include a frame handle extending from the frame to assist rotation of the frame between the first and second positions.

According to at least one additional embodiment, the frame handle may be proximate the latch handle to allow the frame to be disengaged or engaged and rotated from a single location.

The assembly may further include a locking tab extending from the frame to selectively restrain the rotation of the latch handle.

Furthermore, the assembly may include at least a pair of flanges extending from the second end of the frame, and the latch may include at least a pair of tabs configured to selectively engage the pair of flanges.

According to yet another additional embodiment, the flange extending from the frame may be adjustable to vary the engagement between the flange and the tab.

In accordance with yet another aspect of the invention, a method of securing a cover over an opening formed in a pressurized tank is disclosed. The method includes providing a frame with a first end and a second end including a flange extending from the second end, and wherein the frame is configured to support the cover that is sized to engage the opening formed in the pressurized tank. Additionally, the method includes providing a hinge configured to rotatably couple the first end of the frame to the tank so that the cover is rotatable from a first position away from the opening to a second position over the opening, and providing a latch having a tab, wherein the latch is configured to be rotatably coupled to the tank. In addition, the method includes providing a handle coupled to the latch for rotating the latch between a disengaged position at which the frame is rotatable to an engaged position at which rotation of the frame is prevented by engagement between the flange and the tab. The method includes rotating the cover from the first position away from the opening to the second position over the opening, and rotating the handle from the disengaged position at which the frame is rotatable to the engaged position at which rotation of the frame is prevented by engagement between the flange and the tab.

The method may also include rotating the handle from the engaged position at which rotation of the frame is prevented by engagement between the flange and the tab to the disengaged position at which the frame is rotatable, and rotating the cover from the second position over the opening to the first position away from the opening.

The foregoing and other advantages of the invention will appear in the detailed description that follows. In the description, reference is made to the accompanying drawings, which illustrate preferred example embodiments of the invention.

BRIEF DESCRIPTION OF THE DRAWINGS

FIG. 4 is a partial sectional view along line 4-4 of FIG. 2 showing the latching assembly in the engaged position and the cover positioned over the opening formed in the tank;

FIG. 5 is a partial sectional view similar to FIG. 4 showing the latching assembly in a disengaged position and the cover positioned over and vertically spaced apart from the opening;

FIG. 10 is a partial side view of the latching assembly of FIGS. 8 and 9 showing the locking tab and latch in engaged positions and the cover positioned over the opening;

FIG. 11 is a partial side view of the latching assembly of FIGS. 8-10 showing the locking tab and the latch in disengaged positions and the cover positioned over the opening;

DETAILED DESCRIPTION OF THE EXAMPLE EMBODIMENTS

Figure 1:
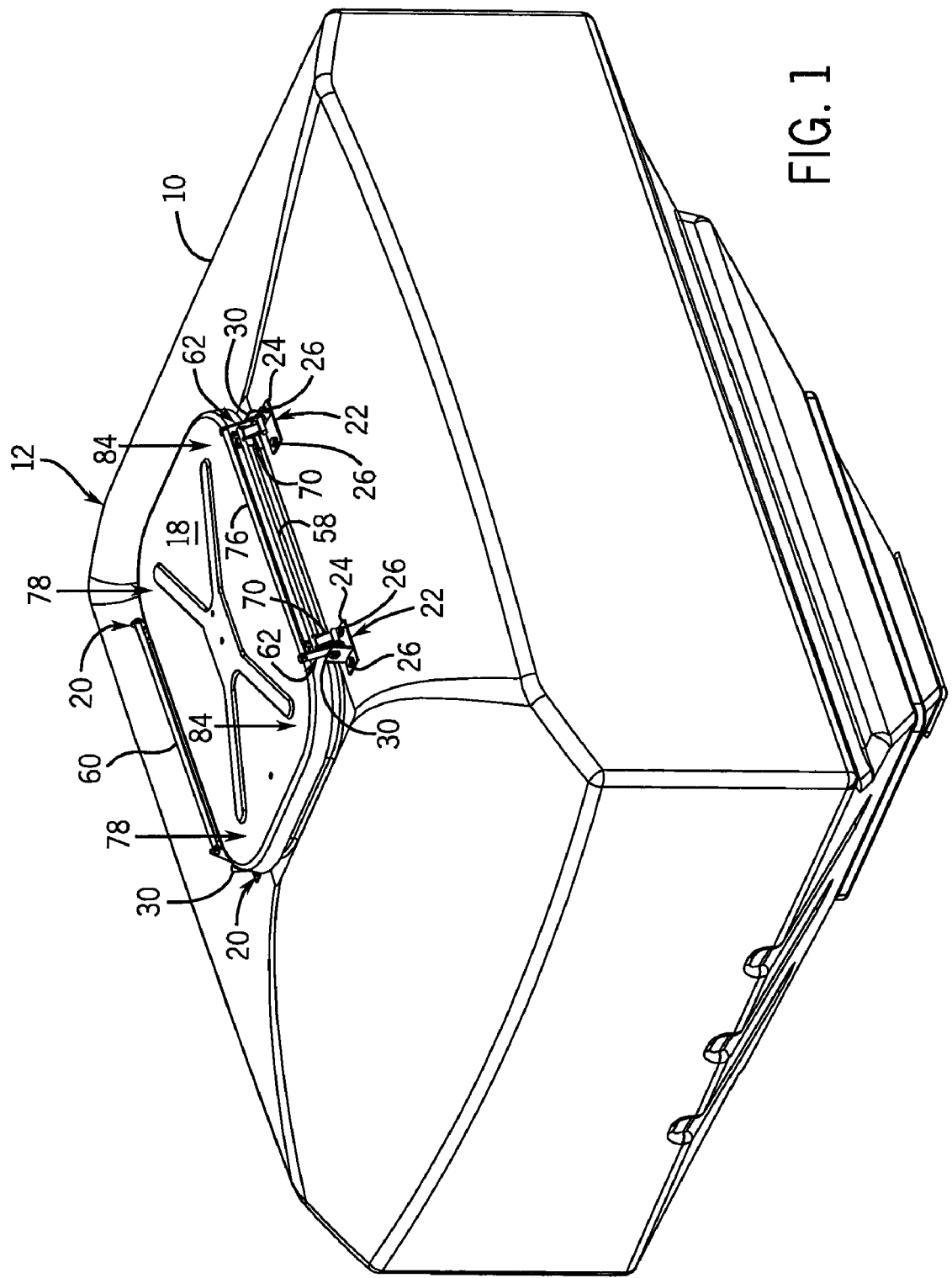
FIG. 1 is a perspective view of a pressurized tank including a latching assembly in accordance with the present invention to seal a cover over an opening formed in the tank.

Referring to FIGS. 1-7, a tank 10 incorporating a latching assembly 12 in accordance with one embodiment of the present invention is shown. While the tank 10 shown is for use with a seeder or air cart, a variety of alternative tanks designed for other operations or applications is contemplated. Specifically, applications requiring a relatively low-pressurized tank can be readily utilized with the latching assembly 12. In particular, relative low-pressurized tanks are designed to have and maintain an internal gage pressure of approximately less than 5 pounds per square inch [34.5 kilopascal]; however extended substance flow paths may necessitate a greater pressure to facilitate delivery.

The tank 10 has a central rectangular opening 14 providing access to an interior 16 of the tank 10 to allow for easy filling of the tank 10 with a desired substance (e.g., seed, fertilizer, and the like). A mating rectangular cover 18 is mounted to the tank 10 by a hinge assembly 20 and selectively secured thereto by a latch assembly 22. The tank 10 and cover 18 are preferably made of plastic, such as polyethylene, but may be made from any other suitable material, such as steel. The tank 10 may vary in size but typically has a volume of approximately 30 bushels [960 quarts] to 100 bushels [3200 quarts]. Depending upon the application requirements, the tank 10 may be pressurized to generally operate between 10 ounces per square inch [4.3 kilopascals] and 16 ounces per square inch [6.9 kilopascals], with higher and lower pressures contemplated. It is of note that, while the opening 14 and mating cover 18 are depicted as rectangular, any other shape or configuration is within the scope of the present invention. For example, a circular opening 14 and mating circular cover 18 as viewed from above are within the purview and scope of the invention.

Figure 3:
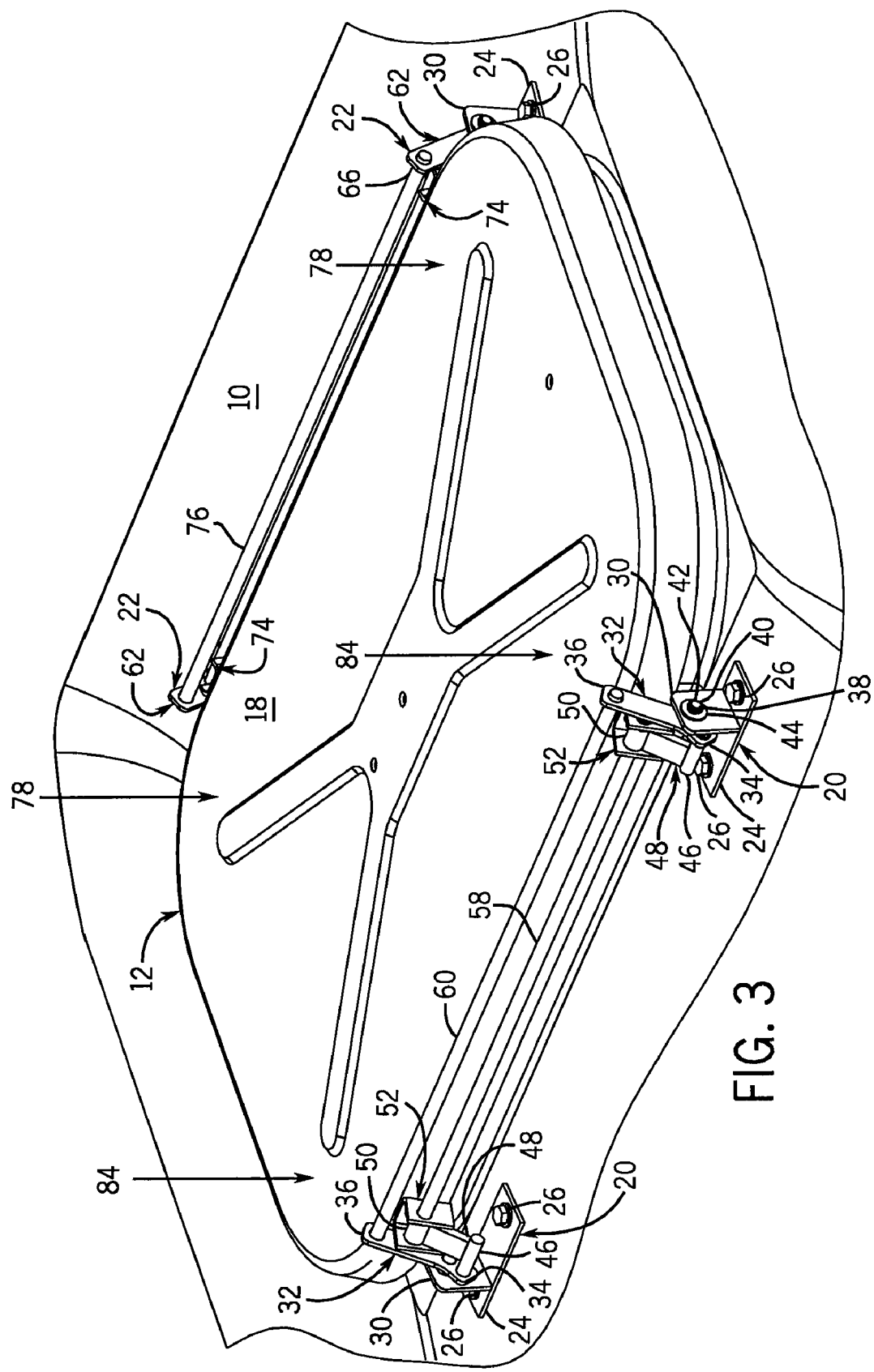
FIG. 3 is a detailed perspective view of the assembly of FIG. 1 as viewed from a hinge assembly side showing the latching assembly in the engaged position.

With specific reference to FIGS. 3 and 4, a pair of hinge assemblies 20 are shown engaged with the cover 18. In accordance with the illustrated arrangement, the hinge assembly 20 is an over-center type hinge that pivotally couples the cover 18 to the tank 10. The illustrated embodiment incorporates a pair of hinge assemblies 20 and a pair of latch assemblies 22, however, a single hinge assembly 20 and latch assembly 22 may be used. Moreover, multiple hinge assemblies 20 and latch assemblies 22 may be used, and not necessarily in matching hinge-latch pairs. Only one of the hinge assemblies 20 will be described as the other is substantially similar and may be mounted to a different location of the tank 10.

The hinge assembly 20 includes a mounting bracket 24 coupled to the tank 10 with a pair of bolts 26 extending through the mounting bracket 24, tank 10, and a support plate 28 located on the interior 16 of the tank 10. The tank 10 is sandwiched between the mounting bracket 24 and support plate 28. Many alternative techniques to couple the mounting bracket 24 to the tank 10 are available, such as molding the mounting bracket 24 integral with the tank 10.

A vertical mounting plate 30 extends normal from the mounting bracket 24 to rotatably couple to an adjacent, spaced-apart, knee-shaped hinge arm 32. The hinge arm 32 is rotatably coupled to the mounting plate 30 at a location between the first end 34 and second end 36 of the hinge arm 32, preferably proximate the bend in the hinge arm 32. In the illustrated embodiment, the hinge arm 32 includes a pin 38 extending through a bearing hole 40 formed in the mounting plate 30 that is captured thereto by a clip 42 adjacent a washer 44. The pin 38 may be integrally formed with the hinge arm 32, welded thereto, or formed by any other suitable means. As with any of the rotatable couplings, more sophisticated methods, such as bearings, may be used.

The first end 34 of the hinge arm 32 is further rotatably coupled to a first end 46 of an adjacent hinge link 48 in a manner similar to that described in reference to the hinge arm 32 above. Alternatively, a more sophisticated bearing or bushing may be used to provide relative rotation between the components. A second end 50 of the hinge link 48 is rotatably coupled to a U-shaped, hinge-cover mount 52. The connecting wall 54 of the hinge cover mount 52 is coupled to the cover 18 by a fastener 56, such as a bolt, or it may be integrally molded as previously described in relation to the mounting bracket 24, may be welded thereto, or the like. The second ends 50 of paired hinge links 48 are linked by a longitudinal rod 58, helping to stabilize the hinge assemblies 20. Additionally, a hinge handle 60 (in the form of a longitudinal rod) links the second ends 36 of the hinge arm 32 for stability and provides an interface for a user to alter the hinge assembly 20 from an engaged position (shown in FIG. 4) to a disengaged position (shown in FIG. 5). Altering the latching assembly 12 between the engaged and disengaged positions is described in detail below.

The mounting bracket 24, support plate 28, mounting plate 30, hinge arm 32, hinge link 48, and hinge cover mount 52 are all preferably formed or manufactured of metal, such as steel or aluminum, but may be made from any suitable material such as plastic or composite depending on the application requirements.

Figure 2:
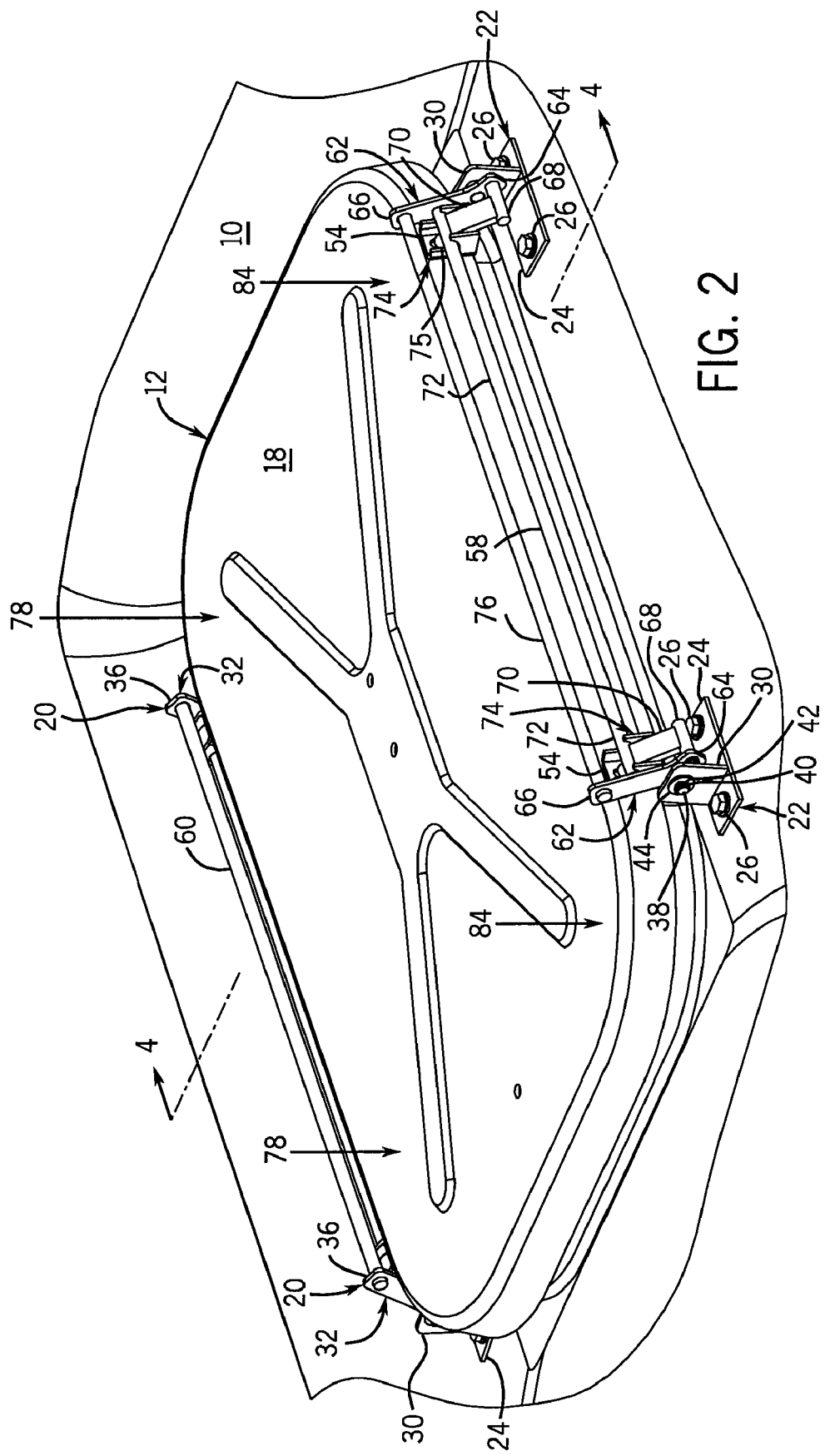
FIG. 2 is a detailed perspective view of the latching assembly of FIG. 1 as viewed from a latch assembly side showing the latching assembly in an engaged position.

With specific reference to FIGS. 2 and 4, a pair of latch assemblies 22 are shown engaged with the cover 18. The latch assembly 22 is similar to the over-center type hinge assembly 20 described above, except that the latch assembly 22 selectively captures the cover 18 to the tank 10. As with the hinge assembly 20, only one of the latch assemblies 22 will be described as the other is substantially similar.

The latch assembly 22 includes a mounting bracket 24 coupled to the tank 10 by a pair of bolts 26 extending through the mounting bracket 24, tank 10, and a support plate 28 located on the interior 16 of the tank 10, so as to sandwich the tank 10 between the mounting bracket 24 and support plate 28. Again, many alternative techniques to couple the mounting bracket 24 to the tank 10 are available and within the scope of the invention.

A vertical mounting plate 30 extends normal from the mounting bracket 24 to rotatably couple to an adjacent spaced apart knee-shaped latch arm 62. The latch arm 62 is rotatably coupled to the mounting plate 30 at a location between the first end 64 and second end 66 of the latch arm 62, preferably proximate the bend in the hinge arm 32. Similar to the hinge assembly 20, the latch arm 62 includes a pin 38 extending through a bearing hole 40 formed in the mounting plate 30 that is captured thereto by a clip 42 riding adjacent a washer 44.

The first end 64 of the latch arm 62 is further rotatably coupled to a first end 68 of an adjacent latch link 70 in a manner similar to that described in reference to the hinge arm 32 above. A second end 72 of the latch link 70 is releasably coupled to a U-shaped latch cover mount 74. The latch cover mount 74 includes a J-shaped cutout 75 for receiving the second end 72 of the latch link 70 when the latch assembly 22 is in the engaged position. The connecting wall 54 of the latch cover mount 74 is coupled to the cover 18 by a fastener 56, or the like. The second ends 50 of paired latch links 70 are linked by a longitudinal rod 58, helping to stabilize the latch assemblies 22. Again, a latch handle 76 (in the form of a longitudinal rod) links the second ends 66 of the latch arm 62 for stability and provides an interface for a user to alter the latch assembly 22 from an engaged position (shown in FIG. 4) to a disengaged position (shown in FIG. 5), described in detail below.

As with the hinge assembly 20, the mounting bracket 24, support plate 28, mounting plate 30, latch arm 62, latch link 70, and latch cover mount 74 are all preferably formed or manufactured of metal, such as steel or aluminum, but may be made from any suitable material such as plastic or composite depending on the application requirements.

When the hinge assemblies 20 and latch assemblies 22 are in the engaged positions, each applies a pressure on the cover 18 to ensure a seal between the opening 14 and the cover 18. Specifically, the hinge assembly 20 imparts a downward first pressure 78 substantially perpendicular to a first compression surface 80 extending along a first plane 82. Additionally, the latch assembly 22 imparts a downward second pressure 84 substantially perpendicular to a second compression surface 86 extending along a second plane 88. The pressures 78, 84 urge the cover 18 into contact with a gasket 90 located, for example, on the perimeter of the opening 14. Additional pressures (e.g., a third pressure and a fourth pressure) may also urge the cover 18 into contact with the gasket 90 at additional compression surfaces and planes (e.g., a third compression surface and plane and a fourth compression surface and plane). In the example embodiment, the compression surfaces and planes are all coplanar, however, the compression surfaces and planes may be spaced apart or misaligned from the remaining compression surfaces and planes. In that situation, the latching assembly 12 is advantageously configurable to apply substantially perpendicular pressures to ensure a uniform seal between the cover 18 and the opening 14.

The sealing between the cover 18 and the gasket 90 provided by the above-described pressures 78, 84 is especially advantageous in situations where the tank 10 and/or cover 18 are made from plastic or other materials that have a tendency to deform under load or pressure. The latching assembly 12 of the present invention is capable of restraining and accounting for significant tank 10 and/or cover 18 deformation due to its general construction and unique operation, described below.

Figure 6:
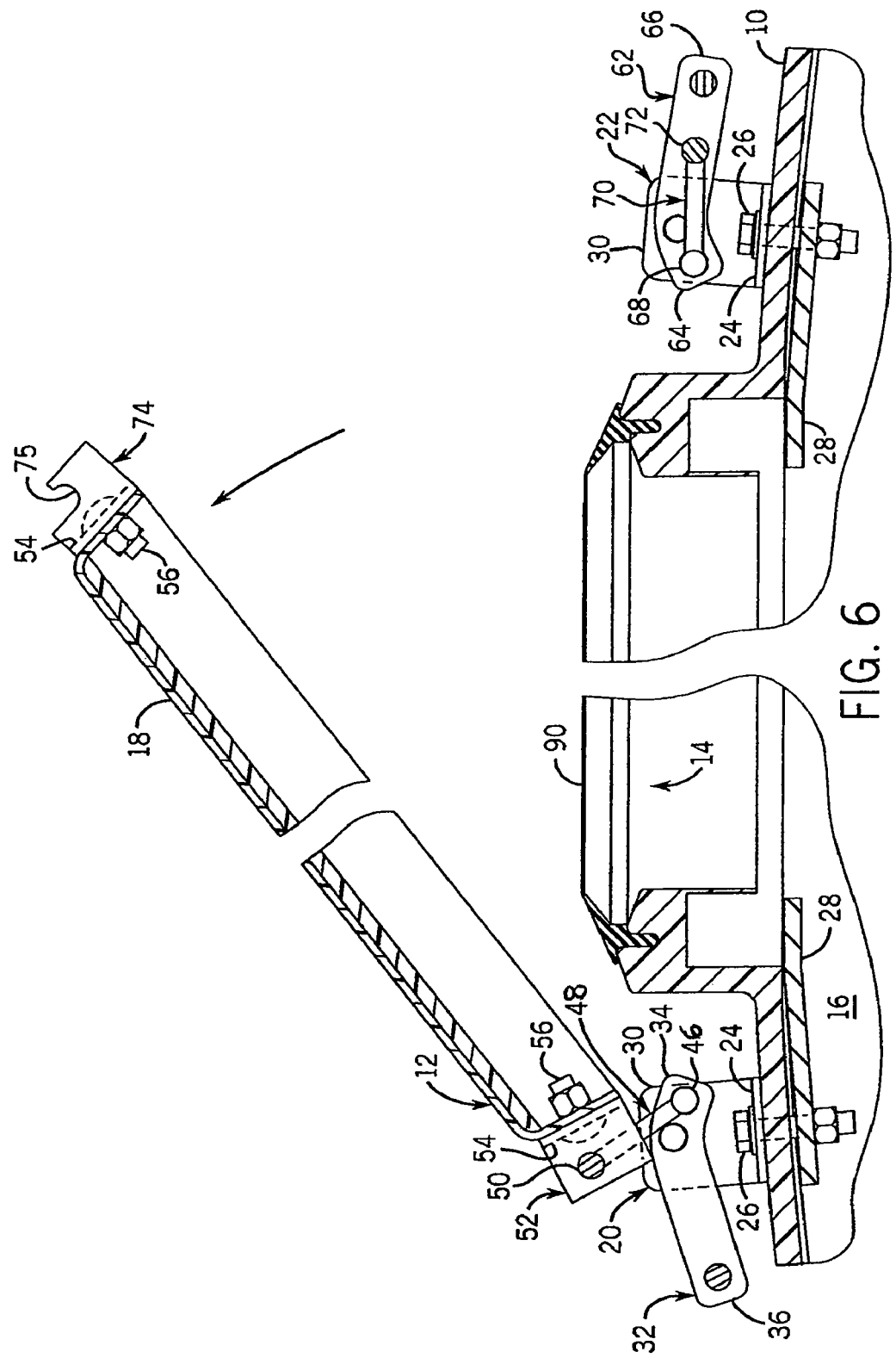
FIG. 6 is a partial sectional view similar to FIG. 5 showing the latching assembly in the disengaged position and the cover partially rotated away from the opening.
Figure 7:
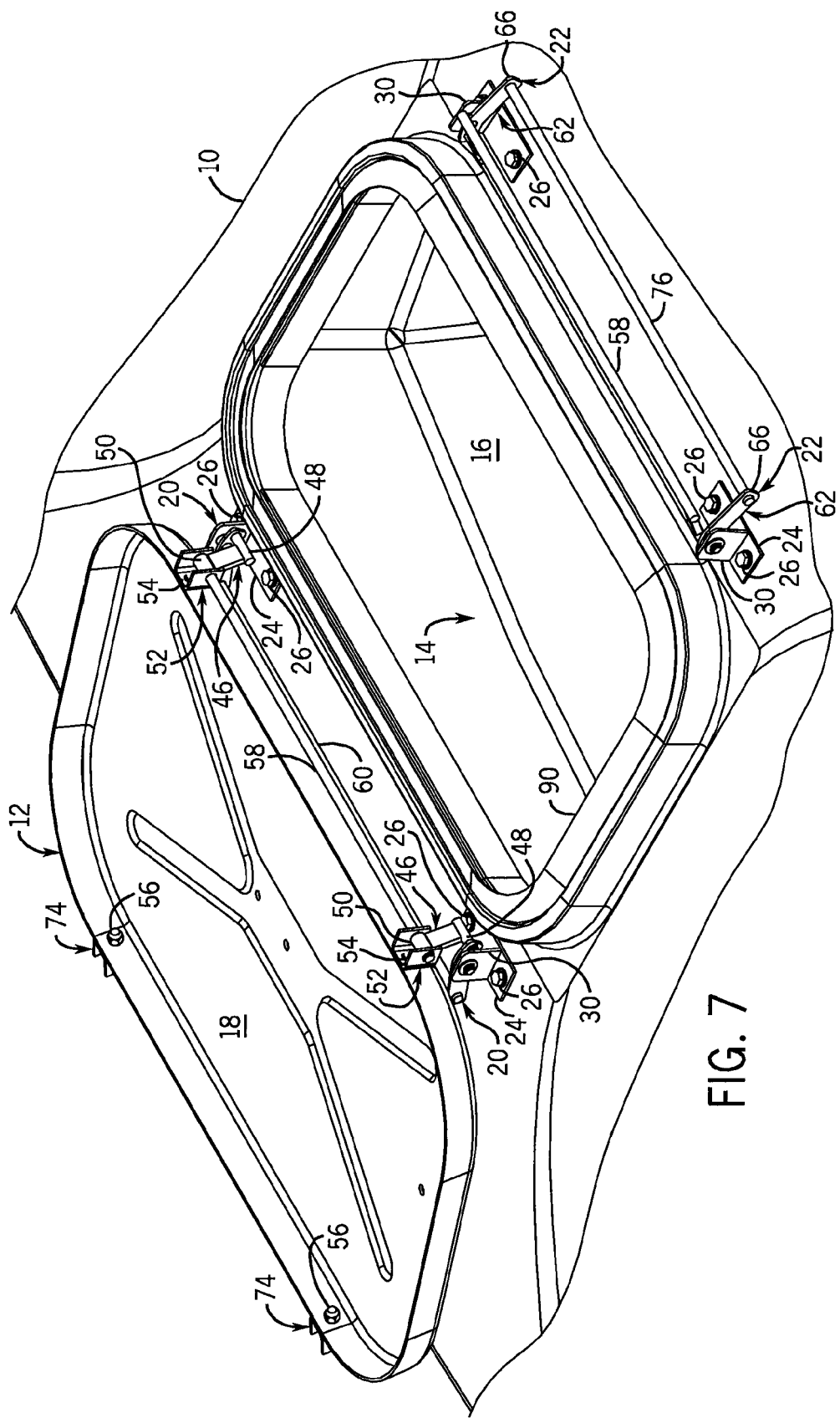
FIG. 7 is a detailed perspective view showing the latching assembly in the disengaged position and the cover fully rotated away from the opening.

With reference to FIGS. 4, 5, and 6, altering the latching assembly 12 from the engaged position shown in FIGS. 1-4 to the disengaged position shown in FIGS. 5-7 is quickly and conveniently accomplished by a single person from a single location. The latch assembly 22 is disengaged from the cover 18 by pivoting the latch handle 76 clockwise (as shown in FIG. 5 by the solid arrow proximate the latch assembly 22). As the latch handle 76 is pivoted, the latch arm 62 begins to rotate about the pin 38. Continuing to pivot the latch handle 76 causes the second end 72 of the latch link 70 to increasingly bear against the cutout 75 in the latch cover mount 74, thus slightly increasing the downward second pressure 84. The downward second pressure 84 is at its peak when points A2, B2, and C2 are collinear. Continuing to rotate the latch handle 76 (and hence latch arm 62) beyond the collinear point reduces the second pressure 84 until the second pressure 84 is approximately negligible.

The latch assembly 22 has the additional benefit of providing a blow-by state at which any pressure differential between the atmosphere and the interior 16 of the tank 10 may equalize without causing the cover 18 to undesirably pivot generally about the hinge assemblies 20. As the latch arm 62 pivots, the seal proximate the latch assembly 22 is incrementally breached, allowing the pressures on both sides of the seal to equalize. Advantageously, the second end 72 of the latch link 70 is still restrained in the cutout 75 of the latch cover mount 74. Therefore should there be a large pressure differential, the latch assembly 22 will prevent the cover 18 from pivoting undesirably.

The hinge assembly 20 is similarly disengaged, although not from the cover 18, by pivoting the hinge handle 60 counterclockwise (as shown in FIG. 5 by the solid arrow proximate the hinge assembly 20). As the hinge handle 60 is pivoted, the hinge arm 32 begins to rotate about the pin 38. As the hinge handle 60 continues to pivot, the second end 50 of the hinge link 48 rotates within the hinge cover mount 52, slightly increasing the downward first pressure 78. The downward first pressure 78 is at its peak when the points A1, B1, and C1 are collinear. Continuing to rotate the hinge handle 60 (and hence hinge arm 32) beyond the collinear point reduces the first pressure 78 until the first pressure 78 is negligible.

Turning to FIGS. 6 and 7, once the latch assemblies 22 and hinge assemblies 20 have been disengaged, the cover 18 may be rotated counterclockwise (as shown in FIG. 6) generally about the hinge assembly 20 until the cover 18 is fully removed from over the opening 14.

Engaging the latching assembly 12 is the reverse of the disengagement described above. The latching assembly 12 provides yet another benefit during engagement. The over-center arrangement of the hinge assembly 20 and the latch assembly 22 allows the cover 18 to undergo a slight amount of substantially vertical motion prior to fully engaging the opening 14. This is best illustrated in viewing FIG. 4 and then FIG. 5. The cover 18, when being altered from the disengaged position to the engaged position, will lower vertically to engage and seal the gasket 90 with the first compression surface 80 and the second compression surface 86 of the illustrated embodiment, thus establishing a uniform seal.

It is of note, that the hinge assembly 20 and latch assembly 22 may be rotated or inverted such that the cover 18 will be urged toward the opening 14 when the hinge handle 60 and latch handle 76 are rotated the opposite directions from those shown in FIG. 5. These alterations, however, are within the scope of the present invention.

Referring to FIGS. 8-15, the tank 10 may incorporate a slightly varied latching assembly 12 in accordance with another embodiment of the present invention. In this case, tubular frame 92 including a first end 94 and a second end 96 having an X-shaped, support structure 98 and a pair of parallel support tubes 100 is included. The frame 92 is preferably made from tubular steel, but may be of various geometries and materials, such as bar aluminum, and the like. The frame 92 is secured to the cover 18 via frame mounts 102 fastened to the cover 18 with bolts, rivets, or the like.

Figure 9:
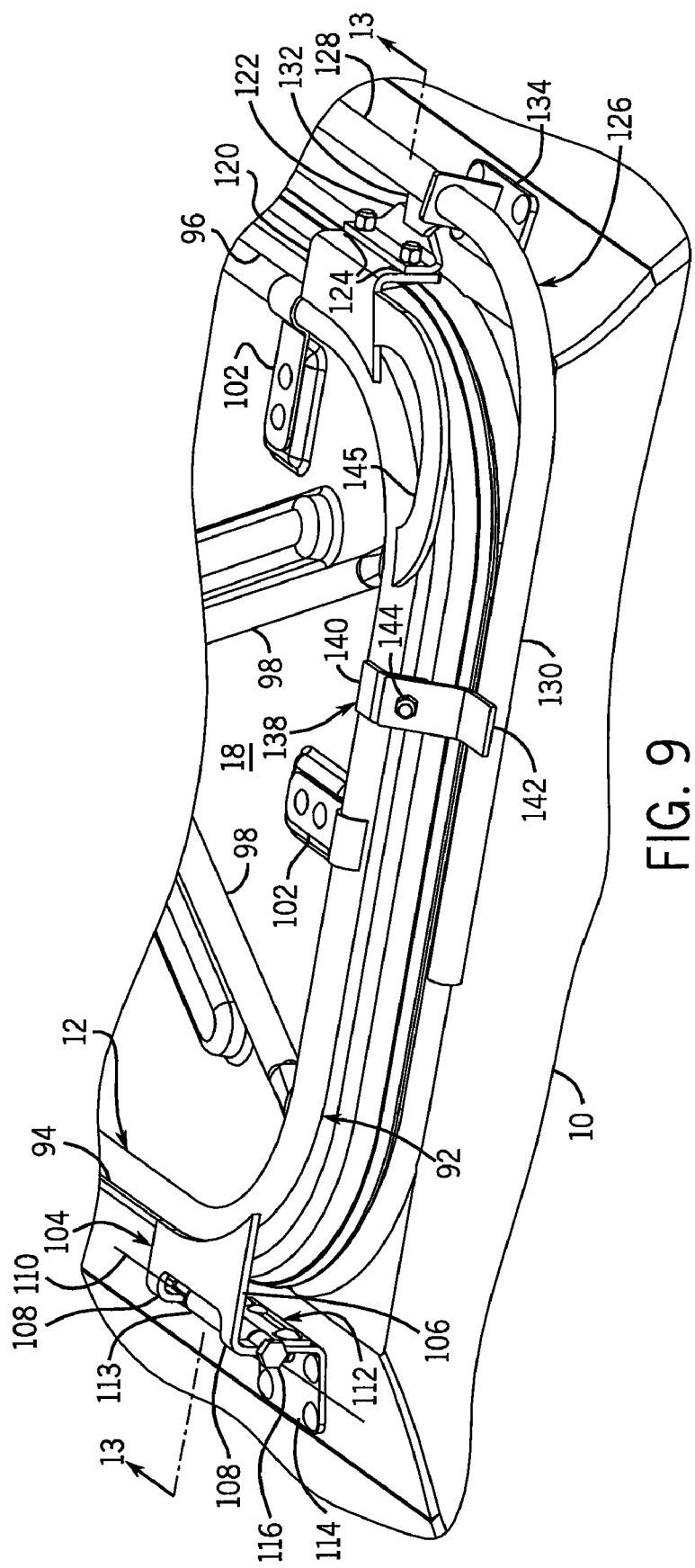
FIG. 9 is a detailed perspective view of the latching assembly of FIG. 8 showing the latching assembly in an engaged position.

With additional reference to FIG. 9, the first end 94 includes a hinge 104 extending there from. The hinge 104 includes a L-shaped upper bracket 106 having a pair of curled tabs 108 forming a hinge axis 110. A mating vertical plate 112 with an upper tube 113 aligned along the hinge axis 110 is coupled to the tank 10 by a L-shaped lower bracket 114. The lower bracket 114 is preferably bolted to the tank 10, but may be fastened by any suitable means, and includes a backer plate 136 disposed on the inside of the tank 10. To rotatably couple the upper bracket 106 and the plate 112, a pin or bolt 116 extends through the upper tube 113 and is aligned along the hinge axis 110 and restrained by a cotter pin or nut 118.

The second end 96 includes L-shaped brackets 120 and a coupled L-shaped flange 122. The brackets 120 include a pair of slots 124 allowing the distance from the tank 10 to the flange 122 to be varied, thus altering the sealing force, as will be discussed below.

A latch 126 is positioned proximate the second end 96 of the frame 92. Preferably, the latch 126 includes an L-shaped tube 128 having a handle 130 substantially perpendicular to the second end 96 for pivoting the tube 128 and attached radial tabs 132. The tube 128 is pivotally coupled to the tank 10 via pivot brackets 134 bolted to the tank 10. The tank 10 is sandwiched between a backer plate 136 and the pivot bracket 134.

Figure 8:
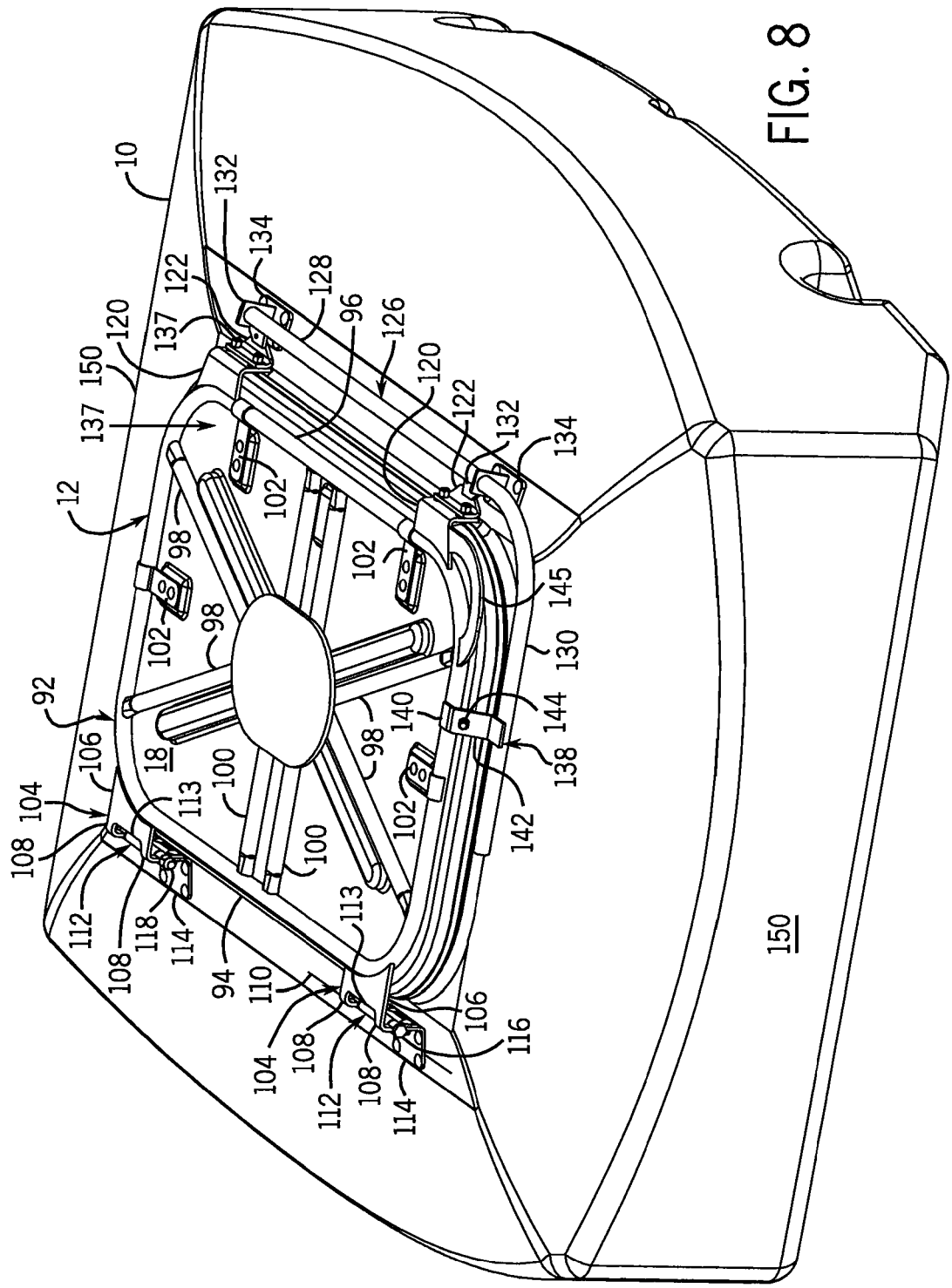
FIG. 8 is a perspective view of the pressurized tank including another latching assembly in accordance with the present invention to seal the cover over the opening formed in the tank.
Figure 13:
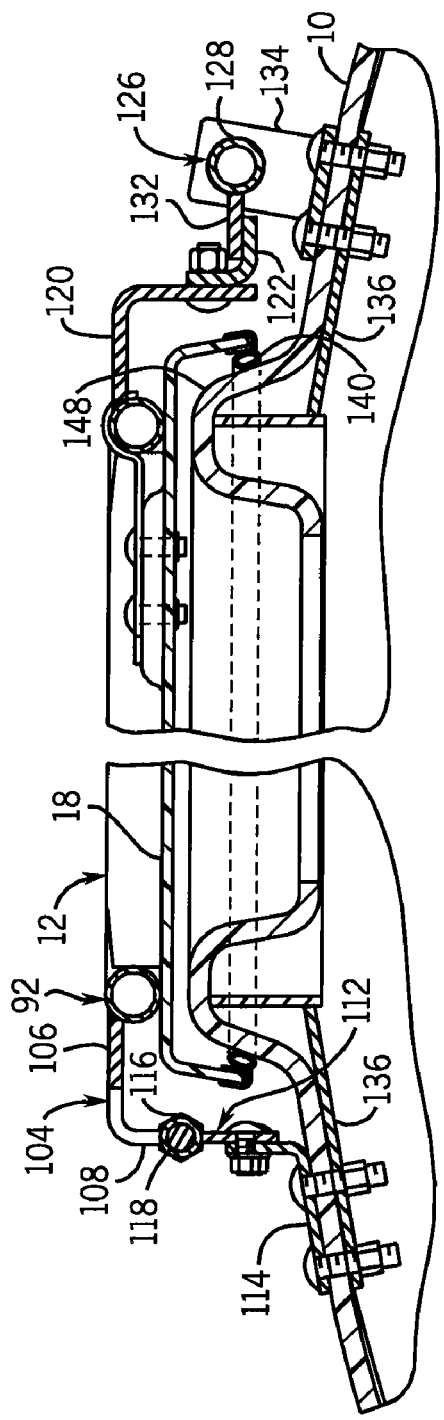
FIG. 13 is a partial sectional view along line 13-13 of FIG. 9 showing the latch in the engaged position and the cover positioned over the opening.

The radial tabs 132 are spaced along the tube 128 so as to be aligned with mating flanges 122 extending from the frame 92. Thus, as shown in FIGS. 8, 9, and 13, when the cover 18 is over the opening 14, the tabs 132 may be rotated into engagement with the flanges 122 to prohibit rotation of the frame 92, and thus cover 18, about the hinge axis 110. A downward force 137 applied to the flanges 122 and ultimately the cover 18 can be altered by adjusting the vertical height of the flanges 122 with the aid of the slots 124.

A locking tab 138 has a stationary portion 140 and a rotating portion 142. As best shown in FIG. 9, the rotating portion 142 of the locking tab 138 can be pivoted about a coupler 144 (e.g., a fastener, such as a bolt) so as to engage the handle 130 of the latch 126. Thus, the latch 126 is prevented from rotating and removing the tabs 132 from interfering with the pivotal path of the flanges 122 extending from the frame 92. The illustrated embodiment includes a pair of flanges 122 and a pair of mating tabs 132, however, more of fewer flanges 122 and tabs 132 may be used depending on the application size and the amount of sealing force desired. The frame 92 also includes a frame handle 145 assisting the user to pivot the frame 92 and cover 18 from a first position away from the opening 14 (shown in FIG. 11) to a second position over the opening 14 (shown in FIG. 8).

In operation, the latching assembly 12 is easy to move from over the opening 14 to away from the opening 14. With specific reference to FIGS. 10 and 13, the cover 18 is shown in the second position over the opening 14 and the latch 126 is depicted in an engaged position. The tabs 132 overlap the flanges 122 such that if the frame 92 is attempted to be pivoted, the flanges 122 would immediately abut the tabs 132 and the frame 92 would be prohibited from rotating.

Additionally, a seal is formed by gasket 146 extending around the perimeter of the cover 18. The sloped rim 148 around the opening 14 allows the pressure of the seal to be adjusted by, again, altering the engagement between the flanges 122 and tabs 132. The unique sealing interface also allows the latching assembly 12 to compensate for deformities and variations in the tank 10 and cover 18.

The locking tab 138 engages the handle 130 of the latch 126 and prevents the handle 130 and tube 128 from pivoting unless desired. Pivoting the locking tab 138 as shown in phantom lines in FIG. 10 allows the latch 126 to rotate.

Figure 14:
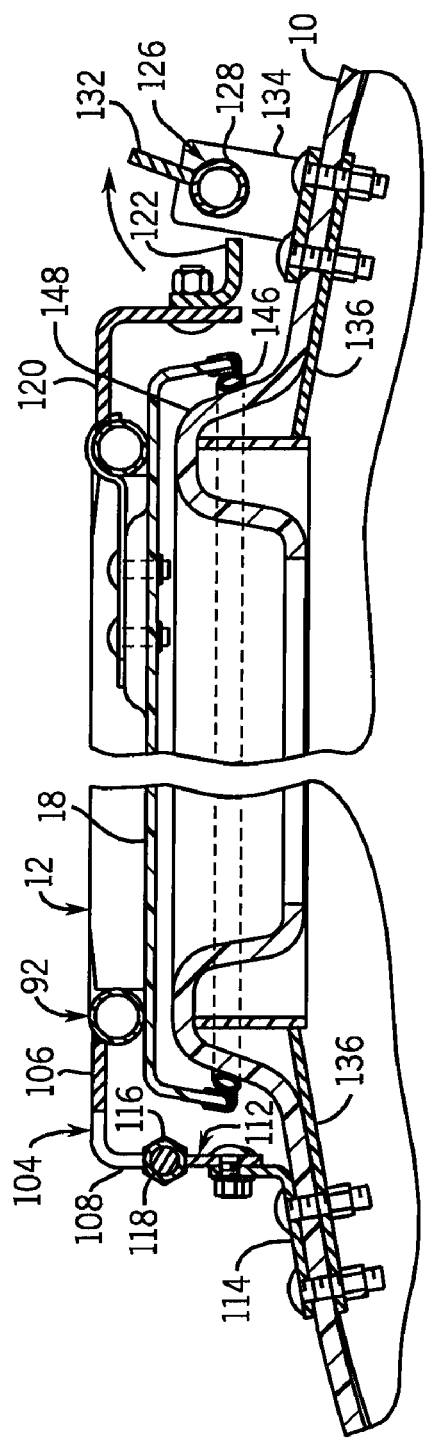
FIG. 14 is a partial sectional view similar to FIG. 13 showing the latch in the disengaged position and the cover positioned over the opening.

Turning to FIGS. 11 and 14, the cover 18 is shown still in the second position over the opening 14 and the latch 126 is illustrated in a disengaged position. In this state, the frame 92 is free to pivot about the hinge axis 110 with minimal effort.

Figure 12:
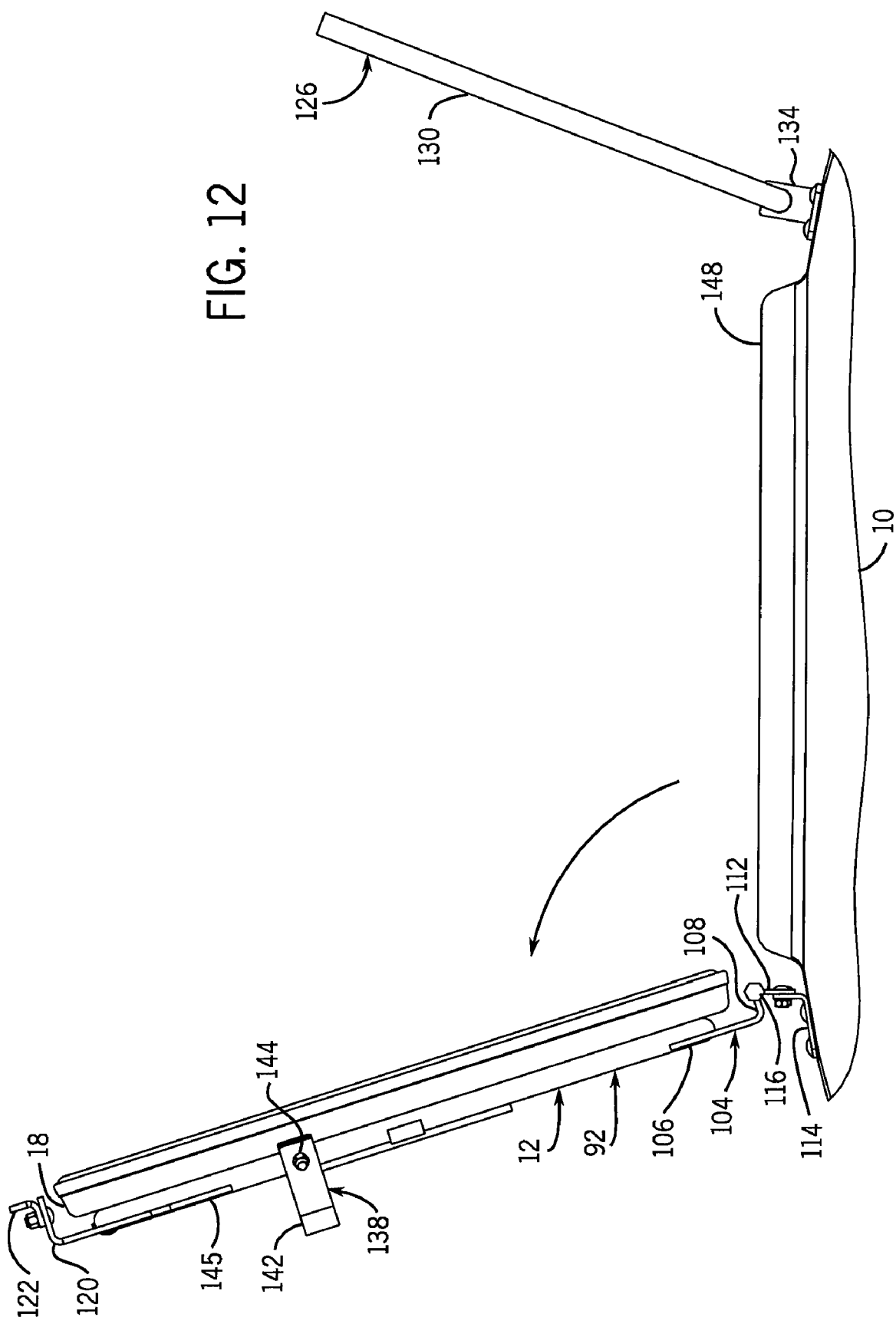
FIG. 12 is a partial side view of the latching assembly of FIGS. 8-11 showing the locking tab and the latch in disengaged positions and the cover partially rotated away from the opening.
Figure 15:
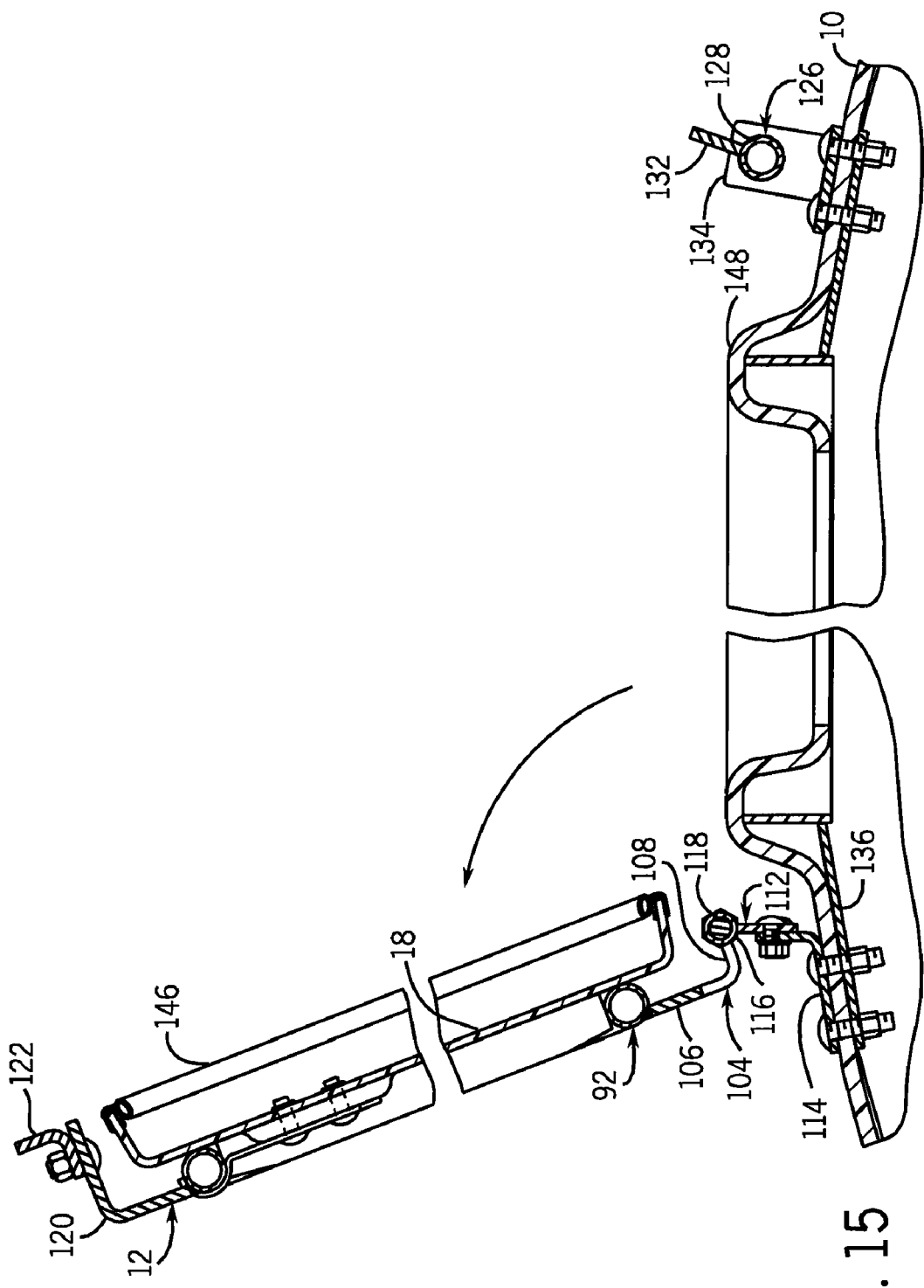
FIG. 15 is a partial sectional view similar to FIG. 14 showing the latch disengaged and the cover partially rotated away from the opening.

Turning to FIGS. 12 and 15, the cover 18 is shown in the first position pivoted away from the opening 14 and the latch 126 is still shown in the disengaged position.

The placement of the handle 130, locking tab 138, and frame handle 145 make the task of pivoting the cover 18 a relatively convenient task that can be easily accomplished from a side of the tank 10, especially the front or back 150 of the tank 10. To open the cover 18, simply swivel the locking tab 138 to the position shown in FIG. 11. Next, grasp the handle 130 and pivot the latch 126 to the position shown in FIG. 11. Finally, grasp the frame handle 145 to ultimately pivot the cover 18 and frame 92 to the position shown in FIG. 12. To close the cover, the steps are performed in reverse.

The above-described systems shown in FIGS. 1-15 secure the covers 18 near the corners. This allows the latching assemblies 12 to better counteract the tendency for plastic tanks 10 and covers 18 to deform under pressure and to accommodate manufacturing tolerances. Additionally, the above-described systems present relatively low-profile latching assemblies 12, which is important where vertical height is limited and reducing the potential for components to snag on trees, power lines, and the like is of substantial importance. Having a low-profile latching assembly 12 also allows the tank 10 to be larger and more efficient during operation. Furthermore, while the illustrated systems depicted rectangular and square openings 14 and covers 18, the invention is applicable to all geometries and shapes. As previously noted, many minor variations may be made to the latching assemblies 12, such as mirroring the travel and/or operation, without exceeding the scope of the present invention.

Several example embodiments of the invention have been described in considerable detail. Many modifications and variations to the example embodiments described will be apparent to a person of ordinary skill in the art. Therefore, the invention should not be limited to the preferred example embodiments described.

I claim:

1. An assembly for covering an opening formed in a pressurized tank of an agricultural vehicle, comprising:
    a cover configured to close the opening having a first compression surface extending along a first axis and a second compression surface extending along a second axis; wherein the first and second axis are coplanar;
    a hinge assembly comprising:
        a hinge arm having a first end and a second end rotatably coupled to the tank intermediate the first and second ends;
        a hinge link having a first end rotatably coupled to the first end of the hinge arm and a second end rotatably coupled to the cover;
    a latch assembly comprising:
        a latch arm having a first end and a second end rotatably coupled to the tank intermediate the first and second ends; and
        a latch link having a first end rotatably coupled to the first end of the latch arm and a second end releasably engageable with the cover;
    wherein:
    rotating the hinge arm from a first hinge position to a second hinge position results in a first pressure engaging the cover along the first compression surface substantially perpendicular to the first axis; and
    rotating the latch arm from a first latch position to a second latch position results in a second pressure engaging the cover along the second compression surface substantially perpendicular to the second axis and the second end of latch link engaging the cover so as to secure the cover over the opening formed in the pressurized tank.

2. The assembly of claim 1, further comprising at least a pair of hinge assemblies spaced apart along the first compression surface of the cover.

3. The assembly of claim 2, further comprising at least a pair of latch assemblies spaced apart along the second compression surface of the cover.

4. The assembly of claim 3, further comprising a hinge handle linking the second ends of the hinge arms.

5. The assembly of claim 4, further comprising a latch handle linking the second ends of the latch arms.

6. The assembly of claim 1, wherein:
the hinge arm and hinge link are configured to create an over center hinge such that in rotating the hinge arm from the first hinge position to the second hinge position toward the cover the hinge arm passes through an intermediate over center hinge position; and
the latch arm and latch link are configured to create an over center latch such that in rotating the latch arm from the first latch position to the second latch position toward the cover the latch arm passes through an intermediate over center latch position.

7. The assembly of claim 1, wherein the cover includes a seal formed about a perimeter of the cover to seal between the cover and the opening formed in the pressurized tank when the first pressure and second pressure engage the cover along the first compression surface and second compression surface, respectively.

* * * * *